United States Patent
Schmedding

(10) Patent No.: US 6,192,812 B1
(45) Date of Patent: Feb. 27, 2001

(54) DEBRIS SHIELD FOR A PLANTER UNIT

(76) Inventor: Stanley R. Schmedding, 113 S. Taft St., Walthill, NE (US) 68067

( * ) Notice: Subject to any disclaimer, the term of this patent is extended or adjusted under 35 U.S.C. 154(b) by 0 days.

(21) Appl. No.: 09/609,826

(22) Filed: Jul. 5, 2000

Related U.S. Application Data

(63) Continuation of application No. 09/182,285, filed on Oct. 29, 1998.

(51) Int. Cl.[7] ........................................ B05B 1/28
(52) U.S. Cl. ........................ 111/52; 111/170; 111/200
(58) Field of Search .......................... 111/14, 200, 52, 111/63, 64, 170

(56) References Cited

U.S. PATENT DOCUMENTS

| | | | |
|---|---|---|---|
| D. 364,836 | 12/1995 | Schlangen et al. | D12/127 |
| 712,624 | 11/1902 | Warner . | |
| 925,541 | 6/1909 | Welch . | |
| 1,110,048 | 9/1914 | Flint . | |
| 1,413,641 | 4/1922 | Whipple . | |
| 2,540,262 | 2/1951 | Higginson | 97/223 |
| 2,753,782 | 7/1956 | Chattin | 97/40 |
| 2,762,285 | 9/1956 | Yetter | 97/53 |
| 3,155,169 | 11/1964 | Mattson et al. | 172/512 |
| 3,714,913 | 2/1973 | Gandrud . | |
| 3,830,455 | 8/1974 | Brightly . | |
| 3,901,325 | 8/1975 | Richards | 172/81 |
| 4,011,622 | 3/1977 | Gillum et al. . | |
| 4,013,192 | 3/1977 | Pillon . | |
| 4,054,063 | 10/1977 | Perrin | 74/611 |
| 4,061,002 | 12/1977 | Drews . | |
| 4,066,130 | 1/1978 | Heppner | 172/81 |
| 4,266,489 | 5/1981 | Parramore . | |
| 4,781,253 | 11/1988 | Cosson | 172/508 |
| 4,784,227 | 11/1988 | Cosson | 172/508 |
| 4,878,443 | 11/1989 | Gardner | 111/141 |
| 5,139,200 | 8/1992 | Greimann et al. . | |
| 5,303,780 | 4/1994 | Evenson | 172/509 |
| 5,611,572 | 3/1997 | Alava | 280/847 |

Primary Examiner—Christopher J. Novosad
(74) Attorney, Agent, or Firm—Zarley, McKee, Thomte Voorhees & Sease; Dennis L. Thomte

(57) ABSTRACT

A debris shield is provided for use with a single furrow planter unit of a multi-row planter. The planter unit comprises a generally horizontally disposed frame including a pair of horizontally spaced-apart frame members which define an opening therebetween. The debris shield of this invention is secured to the frame between the frame members and extends therebetween for preventing debris from passing upwardly past the debris shield.

19 Claims, 5 Drawing Sheets

DEBRIS SHIELD FOR A PLANTER UNIT

CROSS-REFERENCE TO RELATED APPLICATION

This is a continuation application of Petitioner's earlier application Ser. No. 09/182,285 filed Oct. 29, 1998, entitled A DEBRIS SHIELD FOR A PLANTER UNIT, now pending.

BACKGROUND OF THE INVENTION

1. Field of the Invention

This invention relates to a shield for a planter unit and more particularly to a debris shield for a planter unit which prevents debris from moving upwardly into the support frame for the planter unit.

2. Description of the Related Art

Multi-row planters are generally comprised of a plurality of single furrow planter units secured to a tool bar or the like. In certain planters, such as those manufactured by John Deere, the planter unit consists of a seed hopper mounted on a support frame which is pivotally connected to the tool bar or the like by means of a parallel arm arrangement. In some planter units, a granular herbicide/pesticide box is positioned on the support frame rearwardly of the seed hopper. The support frame or panel, as it is termed by John Deere, is comprised of a pair of horizontally spaced frame members or panel members which are generally vertically disposed and which define a space or opening therebetween. A shank assembly is secured to the support frame and is positioned therebelow. The shank assembly includes the conventional gauge wheels, furrow opening disks, furrow closer, etc.

Some sort of seed metering device, such as a seed pick up device, is associated with the discharge opening of the seed hopper for metering seeds from the hopper to a distribution tube extending downwardly therefrom which directs the seeds into the prepared furrow. The upper end of the distribution tube is positioned between the frame members by means of a plate or cover having a rectangular opening formed therein which is in communication with the seed metering device. In certain of the John Deere planter units, a chain and sprocket assembly is mounted between the frame members for driving the seed metering device.

The spacer opening between the frame members, as described above, is open except for the distribution tube and the plate supporting the same. The open area between the frame members presents a major problem in that in certain field conditions, such as a muddy field, the gauge wheels, as well as the furrow opening disks, throw dirt and mud upwardly into the opening between the frames members which creates problems for the chain and sprocket assembly therein. Further, in minimum and no-till fields, cornstalks and the like can poke or stick upwardly between the frame members, thereby creating problems for the chain and sprocket assembly as well as the metering device.

SUMMARY OF THE INVENTION

A debris shield is described for use in combination with a single furrow planter unit of a multi-row planter wherein the planter unit comprises a generally horizontally disposed frame including a pair of horizontally spaced-apart frame members which define an opening therebetween. The planter unit is provided with a seed hopper positioned on the frame members as well as the conventional furrow opening disks, gauge wheels, and furrow closing device. A debris shield is positioned between the frame members below the seed hopper for preventing debris from passing upwardly through the opening towards the sprocket and chain assembly and a metering device positioned therein. In one form of the invention, the debris shield comprises a molded plastic member having an elongated rectangular opening formed therein which is adapted to receive the lower end of the metering device. In another form of the invention, the debris shield comprises a generally rectangular metal member having a rectangular opening formed therein.

It is therefore a principal object of the invention to provide a debris shield for a planter unit.

Still another object of the invention is to provide a debris shield for a planter unit which is positioned below the metering device and the chain and sprocket assembly of the planter unit for preventing debris from passing upwardly thereby.

Still another object of the invention is to provide a device of the type described which may be easily installed on a planter unit.

Still another object of the invention is to provide a device of the type described which is durable in use.

These and other objects will be obvious to those skilled in the art.

DESCRIPTION OF THE PREFERRED EMBODIMENT

Figure 1:
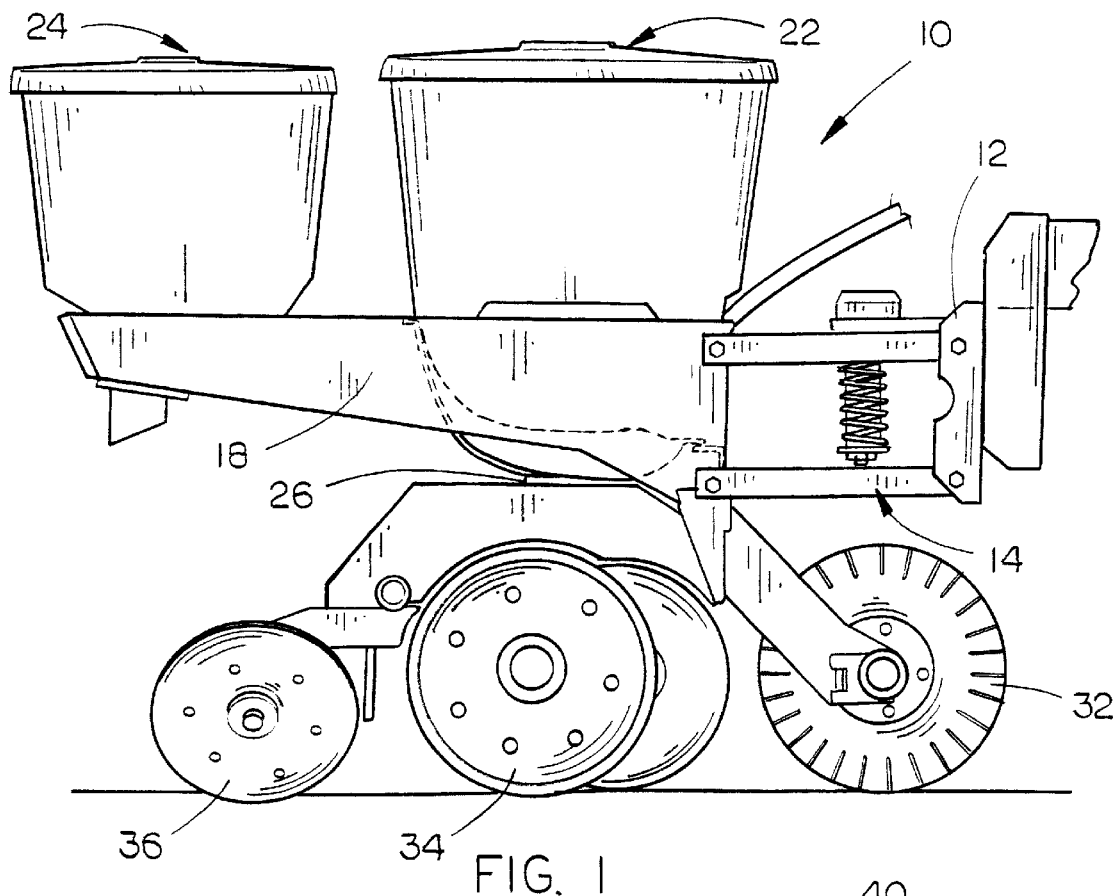
FIG. 1 is a side elevational view of a planter unit having the debris shield of this invention mounted therein.

In FIG. 1, the numeral 10 refers generally to a single furrow planter unit of a multi-row planter such as manufactured by John Deere under the model numbers 7000 and 7100. Unit 10 includes a bracket 12 which is conventionally secured to a tool bar or other frame structure of the planter and which has a parallel arm arrangement 14 secured thereto and which extends rearwardly therefrom in conventional fashion. The rearward end of the parallel arm arrangement 14 is pivotally secured to the forward end of a generally horizontally disposed frame 16 which includes a pair of generally vertically disposed frame members 18 and 20. Support hopper 22 is conventionally positioned on the frame 16 and in some cases, a conventional granular herbicide/pesticide box 24 is provided on the rearward end of the frame 16. John Deere refers to the frame 16 as a support panel.

Figure 3:
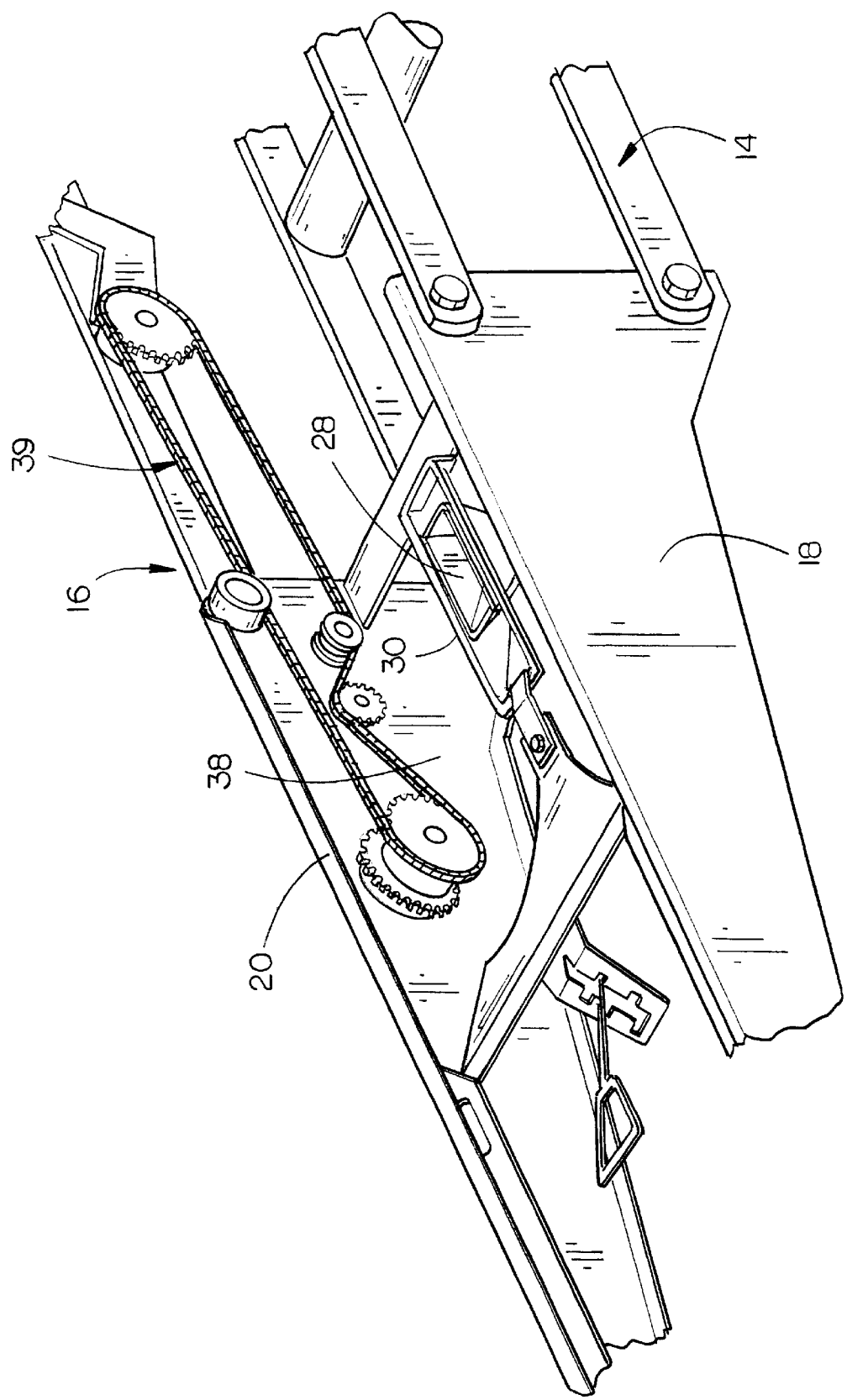
FIG. 3 is a partial perspective view illustrating the support frame of the conventional planter unit.
Figure 5:
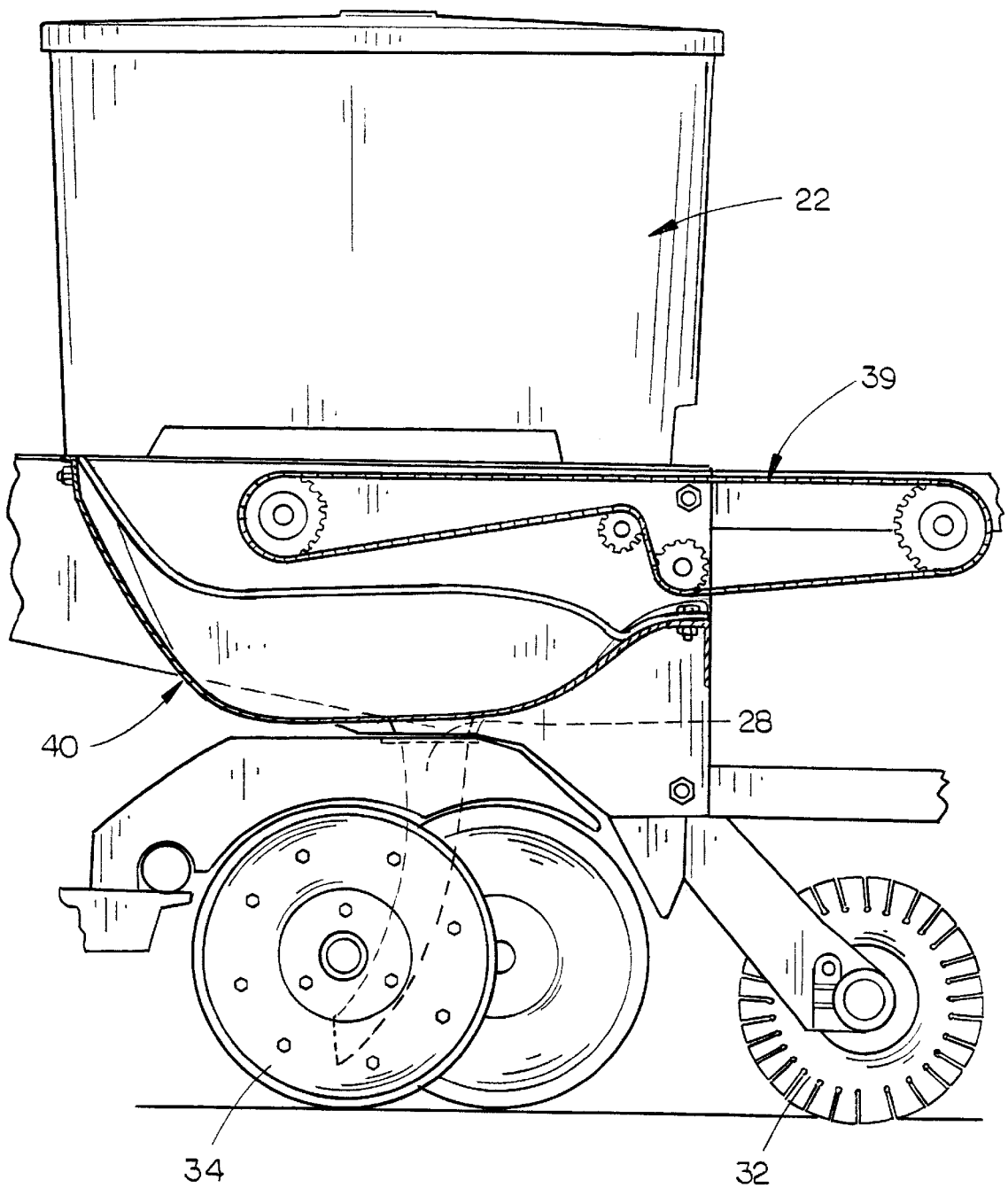
FIG. 5 is a partial vertical sectional view of the planter unit of FIG. 4B.

Support hopper 22 normally has its lower discharge end in communication with some form of seed metering device referred to generally by the reference numeral 26 in FIG. 5. The lower end of the conventional seed metering device 26 is generally rectangular in configuration and is in communication with the upper end of a seed distribution tube 28 which is supported on a plate or cover 30, as best illustrated in FIG. 3. Seed distribution tube 28 extends downwardly from the metering device into the prepared furrow. Planter unit 10 includes conventional structure at the lower end thereof including a furrow opening device 32, gauge wheels 34, and furrow closing device 36. As seen in FIG. 3, the horizontally spaced-apart relationship of frame members 18 and 20 creates an open space therebetween referred to generally by the reference numeral 38.

A conventional chain and sprocket assembly 40 is mounted on the inside surface of frame member 20 and is operatively connected to the metering device for metering seeds from the seed hopper 22 to the distribution tube 28 into the prepared furrow.

In certain field conditions, such as in muddy field conditions, the furrow opening device 32 and the gauge wheels 34 tend to throw mud and dirt upwardly therefrom into the space 38 thereby creating a problem for the chain and sprocket assembly 40, as well as the metering device. Further, in minimum till fields or no-till fields, cornstalks and the like tend to poke or stick upwardly between the frame members 18 and 20 into the space 38, thereby creating problems for the chain and sprocket assembly 40, as well as the metering device. It is for those reasons that the instant invention has been provided.

Figure 2:
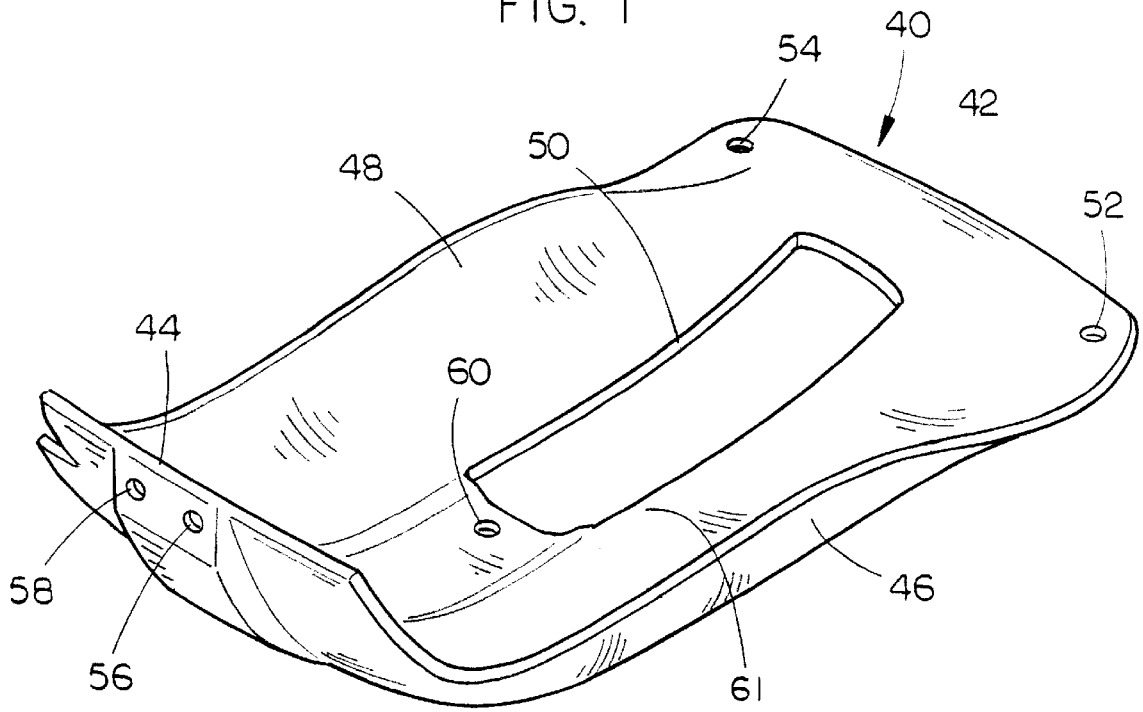
FIG. 2 is a rear perspective view of one form of the debris shield.

The debris shield of this invention is referred to generally by the reference numeral 40 and is preferably constructed of a metal or molded plastic material. Debris shield 40 includes a forward end 42, rearward end 44, and opposite sides 46 and 48. Shield 40 is provided with an elongated rectangular opening 50 having its longitudinal axis aligned with the longitudinal axis of the upper end of the seed distribution tube 28. Shield 40 is provided with a pair of bolt or screw openings 52 and 54 at its forward end and is provided with a pair of bolt or screw openings 56 and 58 at its upper rearward end. Shield 40 is also provided with a bolt or screw opening 60 extending therethrough just rearwardly of the elongated opening 50. As seen in the drawings, the sides 46 and 48 extend upwardly and outwardly from the central portion of the shield which is generally referred to by the reference numeral 62. As also seen in the view of FIG. 2, the forward end of the shield 40 extends upwardly from the central portion 61. Similarly, as seen in FIG. 2, the rearward end of the shield 40 extends upwardly and rearwardly from the central portion 61.

Figure 4A:
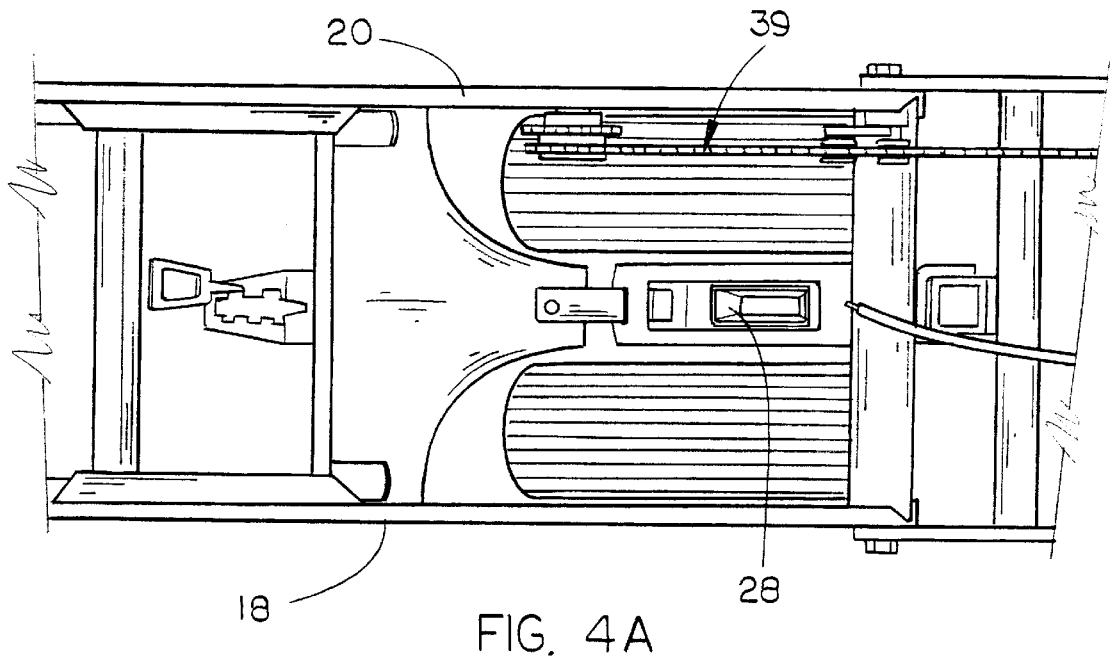
FIG. 4A is a top view of the planter unit of FIG. 3.
Figure 4B:
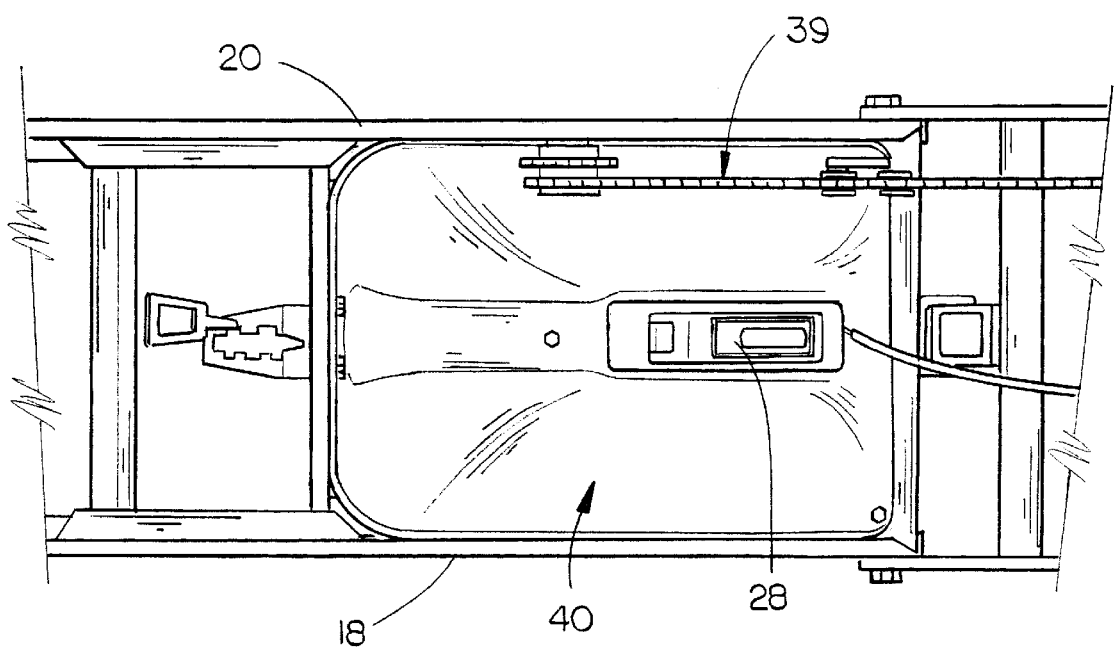
FIG. 4B is a view similar to FIG. 4A except that the debris shield of FIG. 2 is positioned therein.

The shield 40 is designed so that it may be positioned between the frame members 18 and 20 and secured to the frame members 18 and 20, as illustrated in FIG. 4B, so as to close the opening 38. As seen in FIG. 4B, the shield 40 is positioned below the chain and sprocket assembly 40 and has the opening 50 positioned around the opening created by the cover 30 so that the opening 38 is effectively closed. As seen in FIG. 4B, the shield 40 encloses the lower end of the opening 38 which prevents mud and dirt from being thrown upwardly into the opening 38 so that the mud and dirt does not come into contact with the chain and sprocket assembly 39 or the metering device. Further, the shield 40 prevents cornstalks or the like from poking or sticking upwardly through the opening 38 and coming into contact with the chain and sprocket assembly 39 or the metering device.

Figure 6:
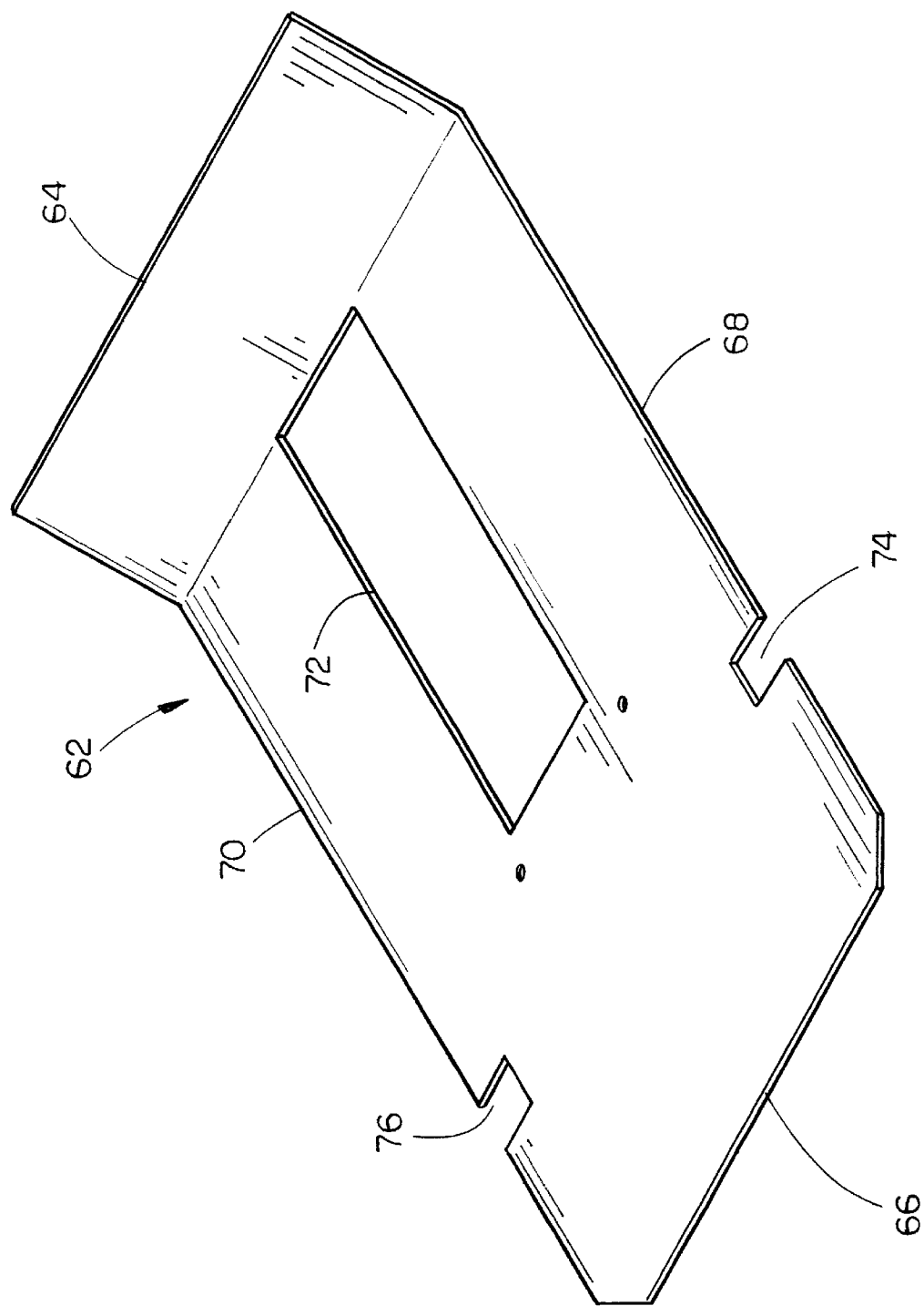
FIG. 6 is a perspective view of a modified form of the debris shield.

FIG. 6 illustrates a modified form of the debris shield which is referred to generally by the reference numeral 62. In certain of the planter unit designs, the shield 62 is better suited for insertion between the frame members 18 and 20 than the arcuate molded plastic shield 40. Preferably, shield 62 is comprised of a metal or plastic material and includes a forward end 64, rearward end 66, opposite sides 68 and 70 and a rectangular opening 72 formed therein. As seen in FIG. 6, the forward end of shield 62 is upwardly turned and is also provided with a pair of spaced-apart notches 74 and 76 formed in the sides thereof adjacent the rearward ends to facilitate the insertion of the shield 62 between the frame members 18 and 20 in certain planter unit designs. The shield 62 functions in the identical fashion as the shield 40 and prevents debris from passing upwardly through the opening 38, thereby ensuring that the chain and sprocket assembly 39, as well as the metering device, will not be subjected to debris.

The debris shield of this invention is easily installed in conventional planter units with a minimum of work and does not interfere with the normal operation of the planter unit.

Thus, it can be seen that the invention accomplishes at least all of its stated objectives.

I claim:

1. In combination:

a single furrow planter unit of a multi-row planter;

said planter unit comprising a generally horizontally disposed frame including a pair of horizontally spaced frame members defining an opening therebetween, a seed hopper positioned on said frame above said frame and having a lower discharge end positioned between said frame members, a seed metering device having a seed distribution tube extending downwardly from said discharge end of said seed hopper between said frame members, a furrow opener below said frame, a gauge wheel assembly below said frame, and a furrow closer below said frame behind said furrow opener;

and a debris shield secured to said frame members which extends therebetween below said seed hopper which extends around said seed distribution tube to substantially close said opening for preventing debris from passing upwardly from said furrow opener and gauge wheel assembly into contact with said seed metering device.

2. The combination of claim 1 wherein said debris shield is comprised of a molded material.

3. The combination of claim 2 wherein said molded material is a plastic material.

4. The combination of claim 2 wherein said debris shield has an elongated opening formed therein.

5. The combination of claim 2 wherein said debris shield is positioned between said frame members and wherein said debris shield has a forward end, a rearward end, and opposite sides; said debris shield having an elongated opening formed therein between said sides rearwardly of its forward end.

6. The combination of claim 5 wherein said rearward end of said debris shield is positioned above said forward end of said debris shield.

7. The combination of claim 1 wherein said debris shield is comprised of a metal material.

8. The combination of claim 7 wherein said debris shield has an elongated opening formed therein.

9. The combination of claim 8 wherein said debris shield has an upwardly bent end portion.

10. The combination of claim 1 wherein said debris shield comprises a substantially flat plastic member.

11. In combination:

a single furrow planter unit of a multi-row planter; said planter unit comprising a generally horizontally disposed frame including a pair of horizontally spaced frame members defining an opening therebetween, a seed hopper positioned on said frame above said frame and having a lower discharge end positioned between said frame members, a seed metering device having a seed distribution tube extending downwardly from said discharge end of said seed hopper between said frame members, a furrow opener below said frame, a gauge wheel assembly below said frame, and a furrow closer below said frame behind said furrow opener;

and a debris shield secured to the frame members which extends therebetween below the seed hopper which extends around the seed distribution tube to substantially close the opening for preventing debris from passing upwardly from the furrow opener and gauge wheel assembly into contact with the seed metering device.

12. The combination of claim 11 wherein said debris shield is comprised of a molded material.

13. The combination of claim 12 wherein said molded material is a plastic material.

14. The combination of claim 12 wherein said debris shield has an elongated opening formed therein.

15. The combination of claim 12 wherein said debris shield is positioned between said frame members and wherein said debris shield has a forward end, a rearward end, and opposite sides; said debris shield having an elongated opening formed therein between said sides rearwardly of its forward end.

16. The combination of claim 15 wherein said rearward end of said debris shield is positioned above said forward end of said debris shield.

17. The combination of claim 11 wherein said debris shield is comprised of a substantially flat metal material.

18. The combination of claim 17 wherein said debris shield has an elongated opening formed therein.

19. The combination of claim 11 wherein said debris shield has an upwardly bent end portion.

* * * * *